C. C. & G. W. MOORE.
POULTRY HOUSE.
APPLICATION FILED APR. 26, 1915.

1,186,326.

Patented June 6, 1916.
2 SHEETS—SHEET 1.

WITNESSES
Fred Roger
A. L. Kitchin

INVENTORS
C. C. Moore
G. W. Moore
BY
ATTORNEYS

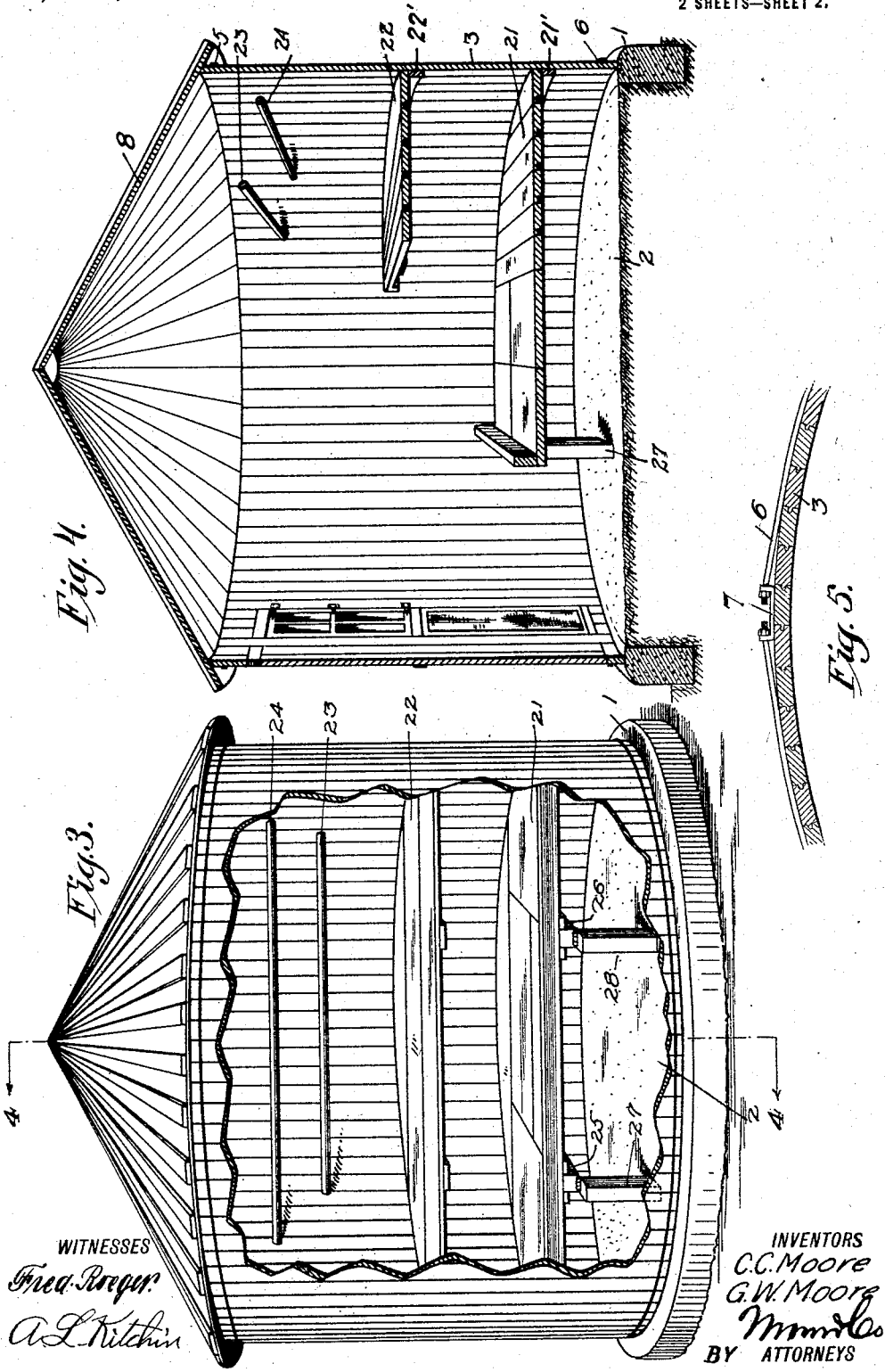

UNITED STATES PATENT OFFICE.

CORNIE C. MOORE AND GEORGE WEBSTER MOORE, OF UNADILLA, NEW YORK.

POULTRY-HOUSE.

1,186,326.   Specification of Letters Patent.   Patented June 6, 1916.

Application filed April 26, 1915. Serial No. 23,918.

*To all whom it may concern:*

Be it known that we, CORNIE C. MOORE and GEORGE W. MOORE, citizens of the United States, and residents of Unadilla, in the county of Otsego and State of New York, have invented a new and Improved Poultry-House, of which the following is a full, clear, and exact description.

This invention relates to poultry houses and particularly to a poultry house which may be rearranged or adjusted so as to be used in different ways in order to answer all the requirements in raising poultry.

Another object in view is to provide a house with a flooring structure which may be adjusted in order to properly accommodate the brood of poultry during any part of its life.

A still further object in view, more specifically, is the provision of a round house arranged with light and ventilating openings whereby a sanitary, dry and comfortable house is provided at all times without excessive draft.

Figure 2:
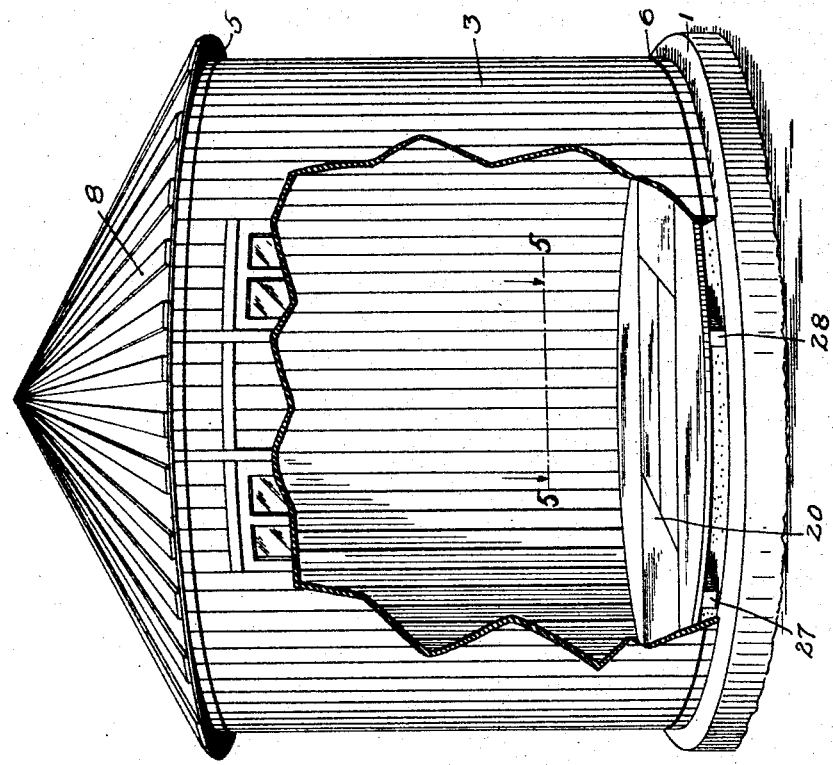
Figure 1:
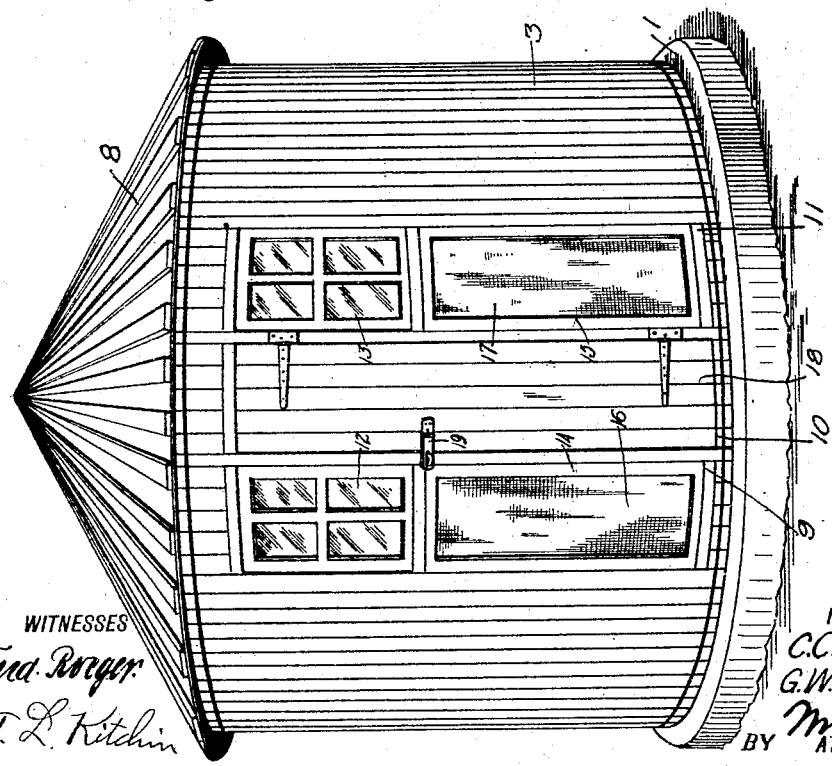

In the accompanying drawings:—Figure 1 is a front view of an embodiment of the invention; Fig. 2 is a view similar to Fig. 1 except that certain parts have been broken away for disclosing the interior, the same being arranged to act as a house adapted to be used as a brooder or colony house; Fig. 3 is a view similar to Fig. 2 but with the flooring rearranged so as to produce a house especially adapted as a breeding pen or as a laying house; Fig. 4 is a sectional view through Fig. 3 on line 4—4; Fig. 5 is a detail fragmentary sectional view through Fig. 2 on line 5—5.

In constructing a house embodying the invention the same may be made solid if desired but is preferably made of a portable character and easily knocked down and set up. The shape of the house, of course, may be varied if desired, but a round structure is preferable as the same produces a very desirable appearance and eliminates dark and drafty corners where dirt is liable to collect.

Referring to the accompanying drawings by numeral, 1 indicates a foundation of any desired kind which may be formed of cement or a metallic ring or other suitable material without departing from the spirit of the invention. An earth or dirt flooring 2 is arranged in ring or foundation 1 and acts as a dirt pan for the poultry. If the entire flooring of the house is made from cement or some other material a suitable quantity of earth is provided so as to be readily utilized by the poultry.

Arranged on the foundation 1 is a circular wall 3 formed of a plurality of dovetailed boards 4 which are held together by bands 5 and 6. These bands are connected by suitable adjustable connection 7 which may be operated by a wrench of any suitable kind so as to tighten the band in place and thereby draw the various parts 4 tightly together. This will prevent any dirt or insects collecting in the cracks or grooves between the parts. Arranged on the wall 3 is a roof 8 which is preferably conical in shape and which may be secured to the wall 3 in any desired way. This roof is formed from boards, rafters and other necessary parts held together by suitable securing means and if desired may be provided with a metallic cap at the apex.

The front of the wall 3 is provided with openings 9, 10 and 11, openings 9 and 11 being provided with windows 12 and 13 and also with frames 14 and 15 carrying muslin strips 16 and 17, respectively. These muslin strips may be exchanged for strips of other cloth or may be entirely removed where a wire mesh is placed so as to cover the openings 9 and 11 exteriorly. The windows 12 and 13 are hinged and preferably swing inwardly so that when the wire mesh coverings are in place over openings 9 and 11 air may freely enter but the poultry cannot get out of the house nor can any animal enter through these openings. The opening 10 is provided with a door 18 which is supported by suitable hinges and which is preferably provided with a latch 19 of any desired kind for holding the door closed. The windows and the muslin 15 and 16 will allow ample light to enter the house and also admit of proper ventilation so that the interior of the house is maintained clean and sanitary and supplied with the proper amount of pure air.

Arranged interiorly of the wall 3 is a flooring 20 which may be arranged as shown in Fig. 2 and when arranged in this position the house is designed to be used as a brooder or as a colony house. When used as a brooder the hover will be placed in the center of the floor which makes it impossible for the stronger of the small chicks to crowd the weaker members of a brood into a corner to suffer from cold and suffocation. Floor 20 may be rearranged as shown in Figs. 3 and 4 and when so arranged the same is designed to be used as a breeding pen or laying house. Floor 2 acts as a dirt pan while floor 21 (Figs. 3 and 4) acts as a scratch flooring. Floor 22 acts as a dropping board or floor for the fowls roosting on the bars 23 and 24. Flooring 21 is supplied with hay, feed and any other desired material providing a proper scratch material for the fowls.

A pair of cleats 21' and 22' are connected to the wall 3 by any suitable means, said cleats being spaced apart and arranged one above the other, as shown in Fig. 4, so as to act as supporting members. It will be seen that the cleat 21' supports one edge of the floor 21 while the opposite edge is supported by the legs 27 and 28. The cleat 22' acts as the sole supporting member for the floor 22 when the same is in the position shown in Fig. 4.

It will be observed from Fig. 4 that the fowls have easy access to all of the floors and to the roosting bars 23 and 24. It will also be noted that the arrangement of the bars 23 and 24 is such as to maintain the remaining part of the house clean or rather to cause the remaining part of the house to need cleaning only at comparatively long intervals. The floor 21 is provided with braces or beams 25 and 26 which are hinged to the uprights 27 and 28 which uprights act as continuations of the beams 25 and 26 when the floor is lowered to the position shown in Fig. 2. It will be evident that nests could be provided at any desired point in the house without disturbing the arrangement as shown particularly in Figs. 3 and 4, whereby ample floor space permits the keeping of a maximum number of fowls in a small house without over-crowding.

What I claim is:—

1. In a device of the character described, a housing, a scratch floor spaced above the bottom of the housing, said scratch floor being arranged on one side of the housing and covering approximately two-thirds of said bottom, a dropping board arranged above said scratch floor and covering approximately one-half of the scratch floor, the arrangement of said scratch floor and said dropping board being a stepped formation for permitting a free circulation of air while affording comparatively large floor spaces on different levels, and roosting bars arranged above said dropping board.

2. In a house of the character described, a wall structure, a roof therefor, a flooring arranged within the wall structure, said flooring being formed in parts, a rafter structure for said flooring formed with a hinged section acting as a leg under some circumstances and a plurality of supporting cleats, one of said cleats acting with said leg structure for supporting part of said flooring in an elevated position in order to provide a scratch flooring and the other of said cleats acting as supports for supporting the remaining part of said flooring so as to act as a dropping board.

3. In a device of the character described, a housing, a flooring formed in two principal parts, one of said parts being provided with a bracing rafter having a hinged extension which acts as a leg, means assisting said leg for supporting a part connected therewith above the floor of the housing, means for supporting the other part of said flooring above said first mentioned part, said first mentioned part being larger than said last mentioned part, and a roosting construction arranged above said smaller part whereby the smaller part will act as a dropping board and the larger part as a scratch board while the bottom of the housing will act as a dirt pan.

In testimony whereof we have signed our names to this specification in the presence of three subscribing witnesses.

CORNIE C. MOORE.
G. WEBSTER MOORE.

Witnesses:
JOHN M. HOPKINS,
NEIL A. HOKE,
WARREN P. DILLON.